(12) United States Patent
Maa et al.

(10) Patent No.: US 12,507,332 B2
(45) Date of Patent: Dec. 23, 2025

(54) LIGHTING APPARATUS WITH GAMMA STIMULATION

(71) Applicant: Aleddra Inc., Renton, WA (US)

(72) Inventors: Chia-Yiu Maa, Bellevue, WA (US); Li-Jyuan Luo, Taipei (TW); Chun-Te Yu, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 248 days.

(21) Appl. No.: 18/408,523

(22) Filed: Jan. 9, 2024

(65) Prior Publication Data

US 2024/0147587 A1    May 2, 2024

Related U.S. Application Data

(63) Continuation-in-part of application No. 18/198,052, filed on May 16, 2023, now Pat. No. 12,317,386,
(Continued)

(51) Int. Cl.
*H05B 45/305* (2020.01)
*H05B 45/10* (2020.01)
*H05B 45/20* (2020.01)

(52) U.S. Cl.
CPC ........... *H05B 45/305* (2020.01); *H05B 45/10* (2020.01); *H05B 45/20* (2020.01)

(58) Field of Classification Search
CPC ............... A61N 5/0618; A61N 5/0622; A61N 2005/0663; A61N 1/0456; A61N 1/36025; A61N 2005/0648; A61N 2005/0651; A61N 2005/0662; A61N 5/062; A61N 1/0404; A61N 1/0476; A61N 1/0492; A61N 1/36014; A61N 2/002; A61N 2/006; A61N 2/02; A61N 2005/0602; A61N 2005/0605; A61N 2005/0606; A61N 2005/0607; A61N 2005/0608; A61N 2005/061; A61N 2005/0611; A61N 2005/0612; A61N 2005/0626; A61N 2005/0627; A61N 2005/0629; A61N 2005/063; A61N 2005/0637; A61N 2005/0642; A61N 2005/0644; A61N 2005/0645; A61N 2005/0647; A61N 2005/0654;
(Continued)

(56) References Cited

U.S. PATENT DOCUMENTS

2022/0036793 A1* 2/2022 Petluri .................. H05B 47/17

* cited by examiner

*Primary Examiner* — Monica C King
(74) *Attorney, Agent, or Firm* — Andy M. Han; Han IP PLLC

(57) ABSTRACT

A lighting apparatus comprises a controller and three lights sources each with a different color temperature. The controller turns on the second light source and the third light source alternately at a strobing frequency between 30 Hz and 65 Hz, resulting in a strobing light (out of the second light source and the third light source) with a combined color temperature approximating the color temperature of the first light source. Alternatively, the lighting apparatus includes a controller and two light sources. The first light source and the second light source operate at different frequencies, resulting in a superimposed light with an operating frequency equal to the difference of these two frequencies. Alternatively, the lighting apparatus turns off one of the two light sources periodically for a short period of time to induce the brain of a subject to better recognize the frequency of the superimposed light.

37 Claims, 5 Drawing Sheets

Related U.S. Application Data which is a continuation-in-part of application No. 18/101,569, filed on Jan. 25, 2023, now Pat. No. 12,127,314, which is a continuation-in-part of application No. 17/981,123, filed on Nov. 4, 2022, now Pat. No. 12,048,078, which is a continuation-in-part of application No. 17/509,877, filed on Oct. 25, 2021, now abandoned, which is a continuation-in-part of application No. 17/148,277, filed on Jan. 13, 2021, now Pat. No. 11,191,863, which is a continuation-in-part of application No. 17/094,567, filed on Nov. 10, 2020, now Pat. No. 11,103,612, which is a continuation-in-part of application No. 16/180,416, filed on Nov. 5, 2018, now Pat. No. 10,874,762.

(58) Field of Classification Search
CPC .... A61N 2005/0659; A61N 2005/0661; A61N 5/0603; A61N 5/0624; A61B 5/4815; A61B 5/0205; A61B 5/024; A61B 5/4812; A61B 5/0031; A61B 5/021; A61B 5/11; A61B 5/1103; A61B 5/1106; A61B 5/1113; A61B 5/165; A61B 5/4064; A61B 5/4088; A61B 5/4809; A61B 5/4818; A61B 5/4821; A61B 5/4836; A61B 5/4884; A61B 2560/0247; A61B 5/0022; A61B 5/0077; A61B 5/01; A61B 5/02055; A61B 5/02438; A61B 5/0531; A61B 5/0816; A61B 5/1114; A61B 5/1118; A61B 5/14532; A61B 5/14551; A61B 5/162; A61B 5/163; A61B 5/168; A61B 5/30; A61B 5/369; A61B 5/372; A61B 5/374; A61B 5/375; A61B 5/377; A61B 5/378; A61B 5/38; A61B 5/389; A61B 5/398; A61B 5/4094; A61B 5/486; A61B 5/6803; A61B 5/6814; A61B 5/6898; A61B 5/7207

See application file for complete search history.

LIGHTING APPARATUS WITH GAMMA STIMULATION

The present disclosure is a continuation-in-part (CIP) of U.S. patent application Ser. No. 18/198,052, filed 16 May 2023, which is a CIP of U.S. patent application Ser. No. 18/101,569, filed 25 Jan. 2023, which is a CIP of U.S. patent application Ser. No. 17/981,123, filed 4 Nov. 2022. Content of aforementioned applications are herein incorporated by reference in their entirety.

BACKGROUND

Technical Field

The present disclosure pertains to the field of lighting apparatus and, more specifically, proposes lighting apparatus with gamma stimulation.

Description of Related Art

It has been discovered that by flickering a light at a frequency between 35 Hz to 45 Hz or generating a sound at a similar frequency has the effect of stimulating the cells in certain region of the brain, resulting in using a flicking light or a sound at such a frequency for treating Alzheimer's disease. However, turning on and off a light source at a frequency between 35 Hz to 45 Hz can create visual discomfort to the eyes of a subject. Different approaches have been introduced to overcome this visual discomfort under 40 Hz flickering light. U.S. patent application Ser. No. 17/981,123 introduces the fusion of two light sources with different spectral power distributions for creating an invisible flickering light. U.S. patent application Ser. No. 18/101,569 teaches the fusion of two light sources each with a distinct color temperature for creating a fused color temperature to achieve the same. U.S. patent application Ser. No. 18/198,052 proposes the adjustment of modulation depth of the light output of a light source for creating an invisible flickering light.

The present disclosure proposes more lighting apparatuses for generating gamma visual stimulation between 30 Hz and 65 Hz. One of them is an extension and combination of the approaches introduced in U.S. patent application Ser. Nos. 18/198,052 and 18/101,569. The other proposed lighting apparatuses are based on superimposition of two lights each operating at a different frequency. With proper configuration, it may be possible to keep the flickering of these two lighting apparatuses invisible to a subject.

SUMMARY

In one aspect, the lighting apparatus comprises a controller and three light sources. The first light source has a first color temperature $C1$. The second light source has a second color temperature $C2$ which is less than $C1$. The third light source has a third color temperature $C3$ which is greater than $C1$. The controller is configured to turn on the first light source without strobing. The controller is also configured to turn on the second light source and the third light source alternately at a strobing frequency between 30 Hz and 65 Hz, resulting in a strobing light (out of the second light source and the third light source) with a combined color temperature approximating $C1$. Note that $C2<C1<C3$ and the color temperature of the strobing light is a linear combination of $C2$ and $C3$. Such linear combination of $C2$ and $C3$ equals $C1$. There are different ways of achieving this. One such way is to choose $C2$ and $C3$ such that $(50\% \times C2 + 50\% \times C3) = C1$. For example, configure the first light source at 4000K emitting 1000 lm, the second light source at 3500K emitting 500 lm and the third light source at 4500K emitting 500 lm. This would create a strobing light at 1000 lm with a color temperature $(50\% \times 3500K + 50\% \times 4500K) = 4000K$. Another way is to choose $C2$ and $C3$ such that $(25\% \times C2 + 75\% \times C3) = C1$. For example, configure the first light source at 4000K emitting 1000 lm, the second light source at 3400K emitting 250 lm and the third light source at 4200K emitting 750 lm. This would create a strobing light at 1000 lm with a color temperature $(25\% \times 3400K + 75\% \times 4200K) = 4000K$. U.S. patent application Ser. No. 18/101,569 provides more examples on the linear combination of color temperatures. This lighting apparatus may be regarded as an extension of claim 8 of U.S. patent application Ser. No. 18/198,052 combined with claim 1 of U.S. patent application Ser. No. 18/101,569.

In some embodiments, the controller is configured to adjust the ratio of the light output of the first light source to the light output of the strobing light. In other words, for these embodiments, the ratio of the light output of the first light source to the light output of the strobing light is adjustable. When the ratio of the light output of the first light source to the light output of the strobing light is over a certain threshold (e.g., a ratio of 1 to 0.1), i.e., when the light output of the strobing light is relatively small as compared to the light output of the first light source, the strobing of the second light source and the third light source becomes less visible or even invisible to a subject. Such threshold varies from person to person. This adjustability of the ratio of the light output of the first light source to the light output of the strobing light allows each user to tune this ratio according to personal tolerance of visible flicker or personal needs which may vary from time to time. For preventive treatment of Alzheimer's disease, the ratio of the light output of the first light source to the light output of the strobing light may be set such that the strobing of the second light source and the third light source is invisible. For advanced Alzheimer's disease treatment, the ratio of the light output of the first light source to the light output of the strobing light may be set such that the strobing of the second light source and the third light source is more visible.

In some embodiments, the first light source, the second light source, and the third light source comprise light emitting diode (LED) or organic LED (OLED).

A recent study on microglia-mediated neuroinflammation and its link to the etiology of Alzheimer's disease through exosomes has shown that NIR wavelengths can penetrate scalp and skulls, and NIR exposure can reduce the amyloid-beta protein level in the visual cortex (see https://www.nature.com/articles/s41377-021-00617-3). The same study also shows that 10 Hz theta stimulation with NIR wavelengths can convert M1 phenotype (inflammatory microglia) to M2 phenotype (anti-inflammatory microglia) in the hippocampus, resulting in inhibition of Alzheimer's disease. Thus, it would be beneficial to use NIR light source in the present invention. In some embodiments, the lighting device further comprises a fourth light source emitting a near-infrared (NIR) wavelength, and the controller is configured to operate the fourth light source at an operating frequency $F1 \leq 65$ Hz. $F1$ frequency may be set between 4 Hz and 10 Hz for theta stimulation, or to 32.5 Hz, 40 Hz, or 65 Hz for gamma stimulation of the brain of a subject.

In another aspect, the lighting apparatus comprises a controller, a first light source emitting an $LO1$ amount of light output (in lumens), and a second light source emitting an LO2 amount of light output (in lumens). The controller is configured to turn on the first light source and the second light source simultaneously thus generating LO1+LO2 amount of light output for the apparatus. Moreover, the controller is configured to operate the first light source at a first operating frequency $F1 \geq 50$ Hz, and to operate the second light source at a second operating frequency $F2$, and $F2$ is greater than $F1$ by at least 30 Hz but not more than 65 Hz. For example, $F1=50$ Hz and $F2=90$ Hz, or $F1=50$ Hz and $F2=82.5$ Hz, or $F1=50$ Hz and $F2=115$ Hz, or $F1=80$ Hz and $F2=120$ Hz. The light emitted by the first light source and the light emitted by the second light source superimpose each other, resulting in a superimposed light having a third operating frequency $F3=F2-F1$.

For illustration, FIG. 2A shows a first light having an operating frequency $F1=8$ Hz and a second light having an operation frequency $F2=12$ Hz. The superimposed light exhibits an operating frequency $F3=12$ Hz-8 Hz=4 Hz, and its first cycle starts from 0 second to 0.25 seconds, the second cycle from 0.25 seconds to 0.5 seconds, etc. FIG. 2A demonstrates the superimposition of sinusoidal light waveforms. Sinusoidal waveforms are not required. FIG. 3A and FIG. 3B show two more examples of superimposition of trapezoidal waveforms. It can be seen from FIG. 3A and FIG. 3B that these superimposed trapezoidal waveforms also exhibit an operating frequency $F3=12$ Hz-8 Hz=4 Hz.

For Alzheimer's treatment, visual stimulation frequency between 35 Hz and 45 Hz is preferred. Thus, in some embodiments, the controller is configured to set F3 be between 35 Hz and 45 Hz, thus creating a stimulation at that frequency to the CA1 hippocampal region, visual cortex and/or prefrontal cortex of the subject, resulting in an improvement in cognitive capabilities of the subject. Scaling F1 frequency and F2 frequency in FIG. 2A by 10 times, i.e., $F1=80$ Hz and $F2=120$ Hz, the superimposed light will have an operating frequency $F3=40$ Hz, suitable for Alzheimer's treatment.

It is also known that vision stimulation at 32.5 Hz or 65 Hz has the effect of improving memory recall. Thus, in some embodiments, the controller is configured to set F3 to be 32.5 Hz or 65 Hz, creating a 32.5 Hz or 65 Hz stimulation to CA3 hippocampal region of the subject, resulting in an improvement in memory recall of the subject.

It can be seen from FIG. 2A to FIG. 2D that as the ratio of LO2 to LO1 changes gradually (e.g., by reducing LO1 gradually), then at a critical ratio (of LO2 to LO1) a subject can no longer discern the flicker of the superimposed light operating at F3 frequency, even though the flicker at F3 frequency of the superimposed light still exists. FIG. 2D is a good example. The flicker at F3 frequency of the superimposed light is very hard to discern. This critical ratio of LO2 to LO1 varies from person to person, depending on the photo-sensitiveness of each person's visual systems. It would be beneficial for the lighting apparatus to support the adjustment of the ratio of LO2 to LO1 so that at times the flickering of the superimposed light operating at F3 frequency can be made visible to the subject, and at other times, the flickering of the superimposed light operating at F3 frequency can be made invisible to the subject. This feature also allows each user to set personal preference on the ratio of LO2 to LO1. Alternatively, everyone can maximize the ratio of LO2 to LO1 for enhanced treatment of Alzheimer or memory loss or lower the ratio of LO2 to LO1 for preventive treatment. Therefore, in some embodiments, the controller is configured to adjust the ratio of LO2 to LO1 (or equivalently LO1 to LO2). The controller may set the ratio of LO2 to LO1 to 1:1, 1:0.5, 1:0.25, etc. or any ratio in between.

The first light source and the second light source may or may not have a same color temperature. In some embodiments, the first light source and the second light source have a same color temperature. If the first light source and the second light source have different color temperatures, then there is the effect of color fusion.

In some embodiments, the controller is configured to adjust F3 frequency for different treatments. For example, a user may toggle F3 frequency between 40 Hz (for Alzheimer's treatment) and 32.5 Hz (for memory recall treatment).

In some embodiments, the first light source and the second light source comprise light emitting diode (LED) or organic LED (OLED).

In some embodiments, the lighting device further comprises a third light source emitting a near-infrared (NIR) wavelength, and the controller is configured to operate the third light source at a fourth frequency $F4 \leq 65$ Hz. F4 frequency may be set between 4 Hz and 10 Hz for theta stimulation, or to 32.5 Hz, 40 Hz, or 65 Hz for gamma stimulation of the brain of a subject.

In another aspect, the lighting apparatus comprises a controller, a first light source emitting an LO1 amount of light output (in lumens), and a second light source emitting an LO2 amount of light output (in lumens). The controller is configured to turn on the first light source and the second light source simultaneously thus generating LO1+LO2 amount of light output for the apparatus. Moreover, the controller is configured to operate the first light source at a first operating frequency F1, and to operate the second light source at a second operating frequency F2 greater than F1. There are no restrictions on the range of F1 (e.g., not required to be greater than 50 Hz) nor on the range of difference between F2 and F1. Here are some examples: (1) $F1=40$ Hz and $F2=44$ Hz, (2) $F1=50$ Hz and $F2=90$ Hz, (3) $F1=50$ Hz and $F2=82.5$ Hz, (4) $F1=50$ Hz and $F2=115$ Hz, and (5) $F1=80$ Hz and $F2=120$ Hz. The light emitted by the first light source and the light emitted by the second light source superimpose each other, resulting in a superimposed light having a third operating frequency $F3=F2-F1$. Moreover, the controller is configured for every fixed period (called the recalibration cycle) to suspend (turn off) one of the two light sources for a short period of time (called the mono light source duration) and to boost the light output of the remaining operating light source for maintaining the total light output of the lighting apparatus at LO1+LO2.

As an example, the controller may set LO1=500 lm at $F1=40$ Hz and LO2=500 lm at $F2=44$ Hz when both light sources are operating, and the controller may further set the recalibration cycle to 10 minutes and the mono light source duration to 6 seconds. Under this scenario, every 10 minutes the controller turns off the second light source for 6 seconds and boosts LO1 to 1000 lm during such 6 seconds. After the mono light source duration (i.e. 6 seconds), the controller reverts the operation of the lighting apparatus back to the regular operation with LO1=500 lm at $F1=40$ Hz and LO2=500 lm at $F2=44$ Hz. The purpose of turning off one of the two light sources periodically (i.e. 10 minutes) for a short duration (i.e., 6 seconds) is to induce the brain of a subject to better recognize the F3 frequency of the superimposed light. This is because when both F1 and F2 frequencies are recognized by the same region of the brain of the subject, the brain sometimes may not sense the F3 frequency due to the analog nature of the brain. By intentionally turning off, say, the second light source for a short period of time, it allows the brain to phase-lock with the F1 frequency of the first light source. Then when the second light source is turned on at the F2 frequency afterwards, the brain can now sense the frequency F3 of the superimposed light based on its reference to the F1 frequency. By repeating such a process (of turning off periodically the second light source briefly) would recalibrate the brain of the subject to detect and maintain its recognition of the F3 frequency of the superimposed light.

In some embodiments, the recalibration cycle is between 1 to 60 minutes. In practice, a recalibration cycle chosen between 5 to 10 minutes may be preferred. In some embodiments, the mono light source duration is between 5 to 20 seconds. In practice, the mono light source duration is between 6 to 10 seconds may be preferred.

In some embodiments, the controller is configured to set F1 to be between 35 Hz and 45 Hz. In some other embodiments, the controller is configured to set F1 to 32.5 Hz or 65 Hz. The frequency between 30 Hz and 65 Hz has the effect of triggering gamma stimulation for the brain.

In some embodiments, the controller is configured to set F3 to be between 35 Hz and 45 Hz. In some other embodiments, the controller is configured to set F3 to 32.5 Hz or 65 Hz. In the scenario when F1=40 Hz and F2=72.5 Hz, it follows F3=32.5 Hz. In other words, this scenario demonstrates an embodiment where both 40 Hz and 32.5 Hz are present, suitable for treating Alzheimer's disease and memory loss simultaneously.

In some embodiments, the controller is configured to set F3 between 3 Hz to 10 Hz. The simulation of 3 Hz to 10 Hz is known to trigger theta stimulation for the brain with benefit for treating other degenerative brain disorders. When both gamma frequency (e.g., 40 Hz) and theta frequency (i.e., 4 Hz) are present, it is known to create what is called cross frequency coupling (CFC), having the benefit of enhancing the effectiveness of the treatment on degenerative brain disorders. An embodiment for supporting CFC effect is for the controller to set F1=40 Hz and F2=44 Hz, resulting in F3=4 Hz. With this embodiment, F1 provides gamma stimulation and F3 induces theta stimulation simultaneously to the brain.

It can be seen from FIG. 2A to FIG. 2D that as the ratio of LO2 to LO1 changes gradually (e.g., by reducing LO1 gradually), then at a critical ratio (of LO2 to LO1) a subject can no longer discern the flicker of the superimposed light operating at F3 frequency, even though the flicker at F3 frequency of the superimposed light still exists. FIG. 2D is a good example. The flicker at F3 frequency of the superimposed light is very hard to discern. This critical ratio of LO2 to LO1 varies from person to person, depending on the photo-sensitiveness of each person's visual systems. It would be beneficial for the lighting apparatus to support the adjustment of the ratio of LO2 to LO1 so that at times the flickering of the superimposed light operating at F3 frequency can be made visible to the subject, and at other times, the flickering of the superimposed light operating at F3 frequency can be made invisible to the subject. This feature also allows each user to set personal preference on the ratio of LO2 to LO1. Alternatively, everyone can maximize the ratio of LO2 to LO1 for enhanced treatment of Alzheimer or memory loss or lower the ratio of LO2 to LO1 for preventive treatment. Therefore, in some embodiments, the controller is configured to adjust the ratio of LO2 to LO1 (or equivalently LO1 to LO2). The controller, for example, may set the ratio of LO1 to LO2 to 1:1, 1:0.5, 1:0.25, etc. or any ratio in between.

The first light source and the second light source may or may not have a same color temperature. In some embodiments, the first light source and the second light source have a same color temperature. If the first light source and the second light source have different color temperatures, then there is the effect of color fusion.

In some embodiments, the controller is configured to adjust F3 frequency for different treatments. For example, a user may toggle the F3 frequency between 4 Hz (theta stimulation), 32.5 Hz (for memory recall treatment), and 40 Hz (for Alzheimer's treatment).

In some embodiments, the first light source and the second light source comprise light emitting diode (LED) or organic LED (OLED).

In some embodiments, the lighting device further comprises a third light source emitting a near-infrared (NIR) wavelength, and the controller is configured to operate the third light source at a fourth frequency F4≤65 Hz. F4 frequency may be set between 3 Hz and 10 Hz for theta stimulation, or to 32.5 Hz, 40 Hz, or 65 Hz for gamma stimulation of the brain of a subject.

In another aspect, the lighting apparatus comprises a controller, a first light source emitting a near-infrared (NIR) wavelength, and a second light source emitting a visible wavelength. The first light source may or may not emit visible wavelengths, though it is preferred that it emits only NIR wavelengths and no visible wavelengths. Similarly, the second light source may or may not emit NIR wavelengths, though it is preferred that it emits only visible wavelengths and no NIR wavelengths. The controller is configured to turn on the first light source and the second light source simultaneously. Moreover, the controller is configured to operate the first light source at a first operating frequency F1≤65 Hz, and to operate the second light source at a second operating frequency F2 greater than F1. Here are some examples: (1) F1=10 Hz and F2=50 Hz, (2) F1=40 Hz and F2=50 Hz, and (3) F1=65 Hz and F2=95 Hz. Moreover, the light emitted by the first light source and the light emitted by the second light source superimpose each other, resulting in a superimposed light having a third operating frequency F3=F2−F1.

In some embodiments, the controller is configured to set F1 to be between 3 Hz and 10 Hz. For example, F1=4 Hz and F2=44 Hz; or F1=10 Hz and F2=50 Hz. If the first light source emits only NIR wavelengths, its light is invisible to a subject, and thus the subject perceives no flickering at any F1 frequency. In some other embodiments, the controller is configured to set F1 to be between 35 Hz and 45 Hz. Further in some other embodiments, the controller is configured to set F1 to 32.5 Hz or 65 Hz.

In some embodiments, the controller is configured to set F3 between 3 Hz to 10 Hz. In some other embodiments, the controller is configured to set F3 to be between 35 Hz and 45 Hz. Further in some other embodiments, the controller is configured to set F3 to 32.5 Hz or 65 Hz.

In some embodiments, the controller is configured to adjust F3 frequency for different treatments. For example, a user may toggle the F3 frequency between 4 Hz, 10 Hz (theta stimulation), 32.5 Hz (for memory recall treatment), and 40 Hz (for Alzheimer's treatment).

In some embodiments, the controller is configured for every fixed period (called the recalibration cycle) to suspend (turn off) the first light source for a short period of time (called the mono light source duration). During the mono light source duration, there is no need to boost the light output of the second light source since the NIR light source doesn't contribute to the light output of the lighting apparatus. Nonetheless, the recalibration cycle and the mono light source duration may still be necessary to recalibrate the brain of the subject to detect and maintain its recognition of the F3 frequency of the superimposed light.

In some embodiments, the recalibration cycle is between 1 to 60 minutes. In practice, a recalibration cycle chosen between 5 to 10 minutes may be preferred. In some embodiments, the mono light source duration is between 5 to 20 seconds. In practice, the mono light source duration is between 6 to 10 seconds may be preferred.

In some embodiments, the first light source and the second light source comprise light emitting diode (LED) or organic LED (OLED).

BRIEF DESCRIPTION OF THE DRAWINGS

The accompanying drawings are included to aid further understanding of the present disclosure and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety of lighting apparatuses having different form factors.

A lighting apparatus comprises a controller and three lights sources each with a different color temperature. The controller turns on the second light source and the third light source alternately at a strobing frequency between 30 Hz and 65 Hz, resulting in a strobing light (out of the second light source and the third light source) with a combined color temperature approximating the color temperature of the first light source. Another lighting apparatus comprises a controller and two light sources. The first light source and the second light source operate at different frequencies, resulting in a superimposed light with an operating frequency equal to the difference of these two frequencies. By setting the third frequency to 32.5, 40, or 65 Hz, the lighting apparatus triggers visual stimulation of a subject for treating Alzheimer's disease or memory recall disease. Another variation of the present disclosure would turn off one of the two light sources periodically for a short period of time to induce the brain of a subject to better recognize the frequency of the superimposed light.

Example Implementations

Figure 1:
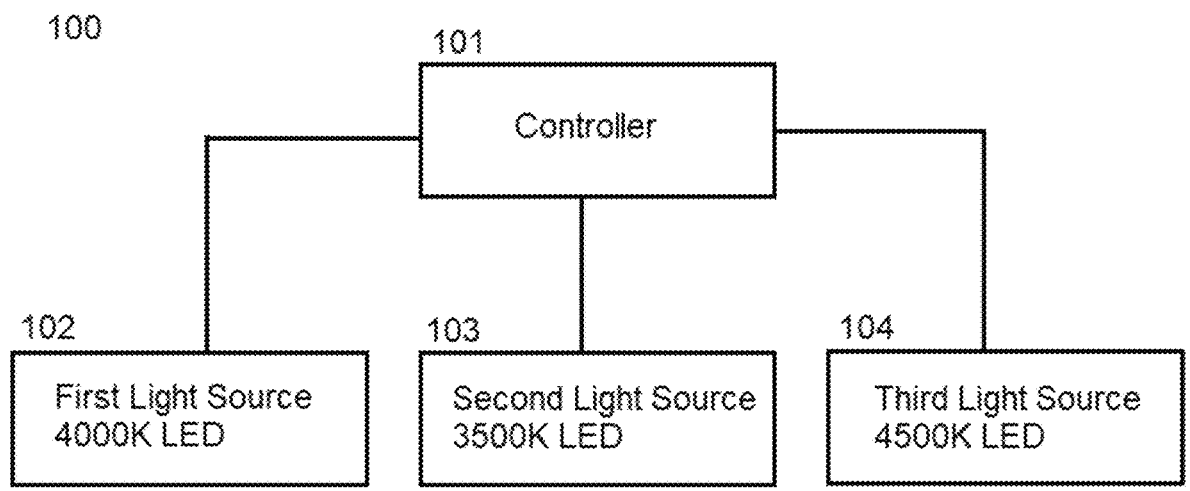
FIG. 1 schematically depicts an embodiment of the present disclosure with three LED light sources.
Figure 2A:
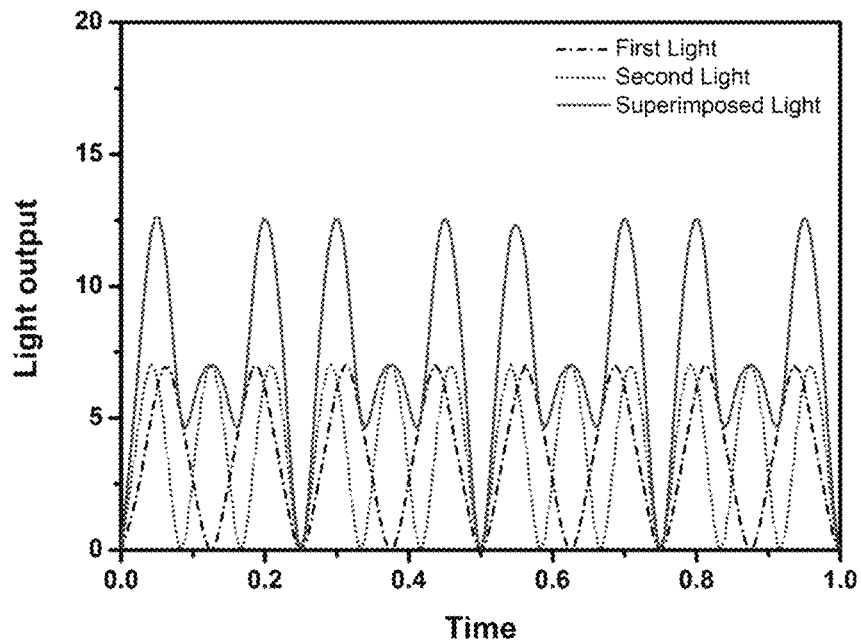
FIGS. 2A, 2B, 2C, and 2D schematically depict the superimposing of two sinusoidal light waveforms with F1=8 Hz and F2=12 Hz, and the LO2-to-LO1 ratio is 1:1, 1:0.5, 1:0.25, 1:0.1 as shown in FIGS. 2A, 2B, 2C, and 2D, respectively.
Figure 2B:
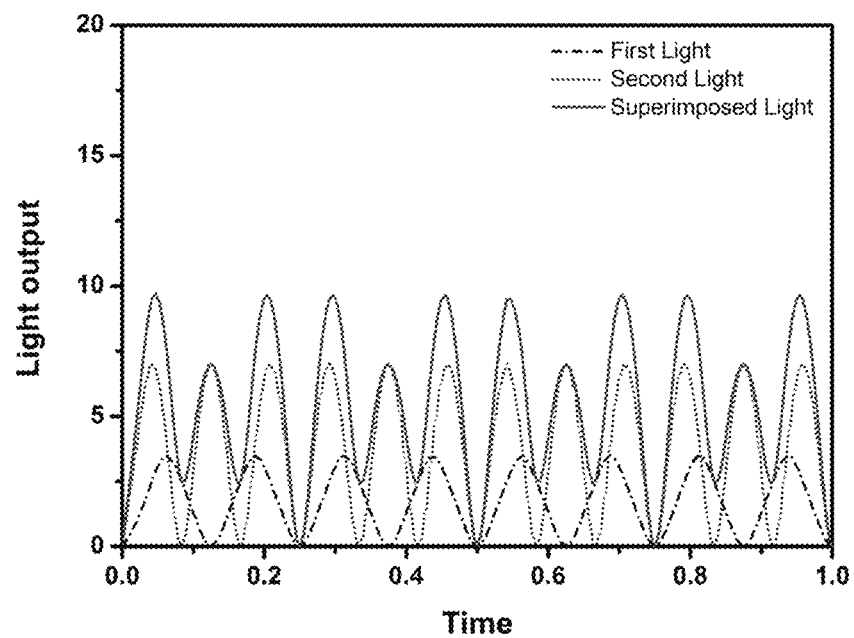
Figure 2C:
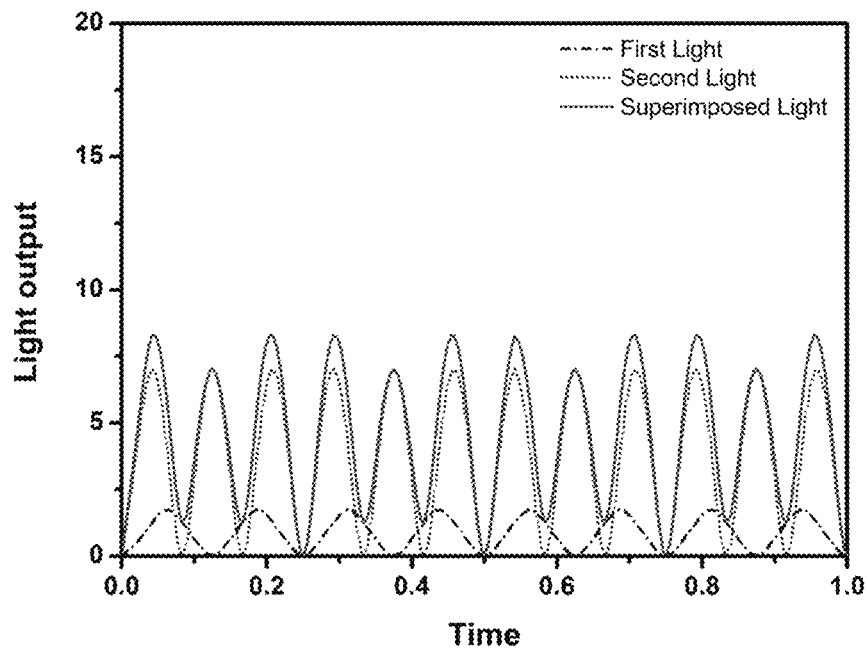
Figure 2D:
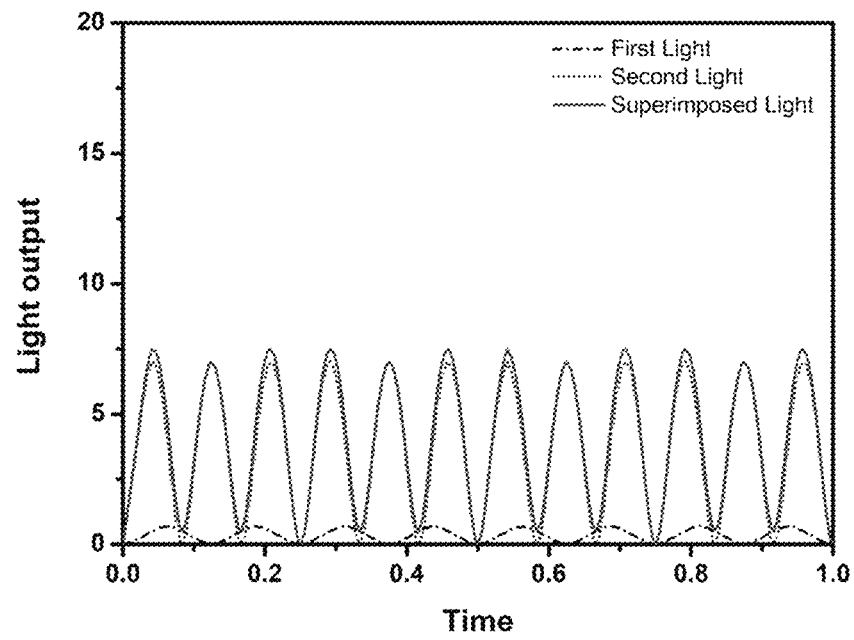
Figure 3A:
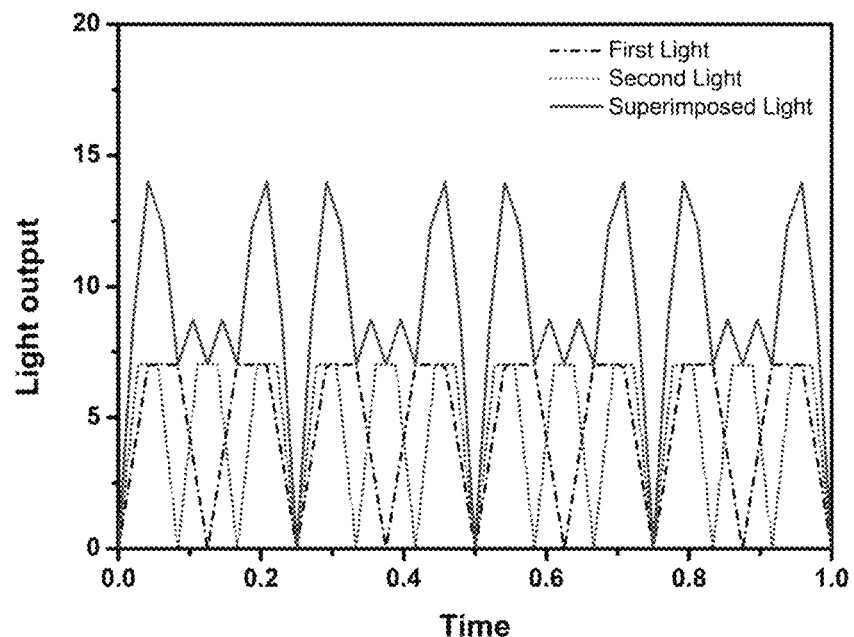
FIG. 3A and FIG. 3B schematically depict the superimposing of two trapezoidal light waveforms at F1=8 Hz and F2=12 Hz, and in FIG. 3A the ON-state duration for both waveforms is shorter and in FIG. 3B the ON-state duration for both waveforms is longer.
Figure 3B:
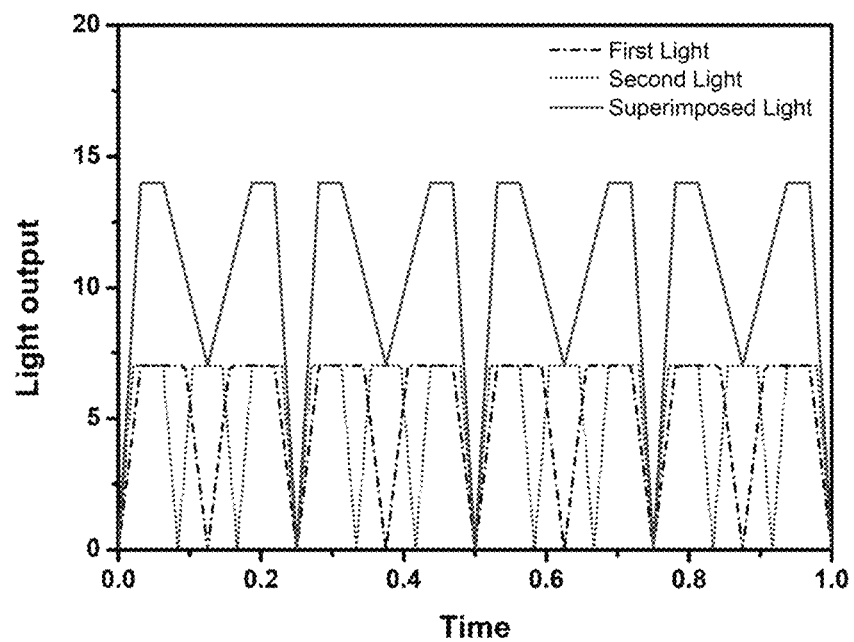

FIG. 1 is an embodiment of the lighting apparatus of the present disclosure 100. It comprises a controller 101, and three light sources 102, 103, and 104. The first light source 102 is 4000K LED, the second light source 103 is 3500K LED, and the third light source 104 is 4500K LED. Controller 101 turns on the first light source 102 without strobing with a light output 1000 lm. The second light source 103 has a max light output 500 lm and the third light source 104 has a max light output 500 lm. Controller 101 turns on the second light source 103 and the third light source 104 alternately at a strobing frequency between 30 Hz and 65 Hz, resulting a strobing light at 1000 lm output and a blended color temperature at (3500K+4500K)/2=4000K. When the strobing frequency is set to 40 Hz, embodiment 100 may be used for treating Alzheimer's disease. When the strobing frequency is set to 32.5 Hz or 65 Hz, embodiment 100 may be used for treating memory loss disease.

Though not shown, controller 101 can be configured to adjust the ratio of the light output of the first light source 102 to the light output of the strobing light (out of the second light source 103 and the third light source 104) by lowering the light output of the second light source 103 and of the third light source 104. When such ratio is 1:1, the strobing of the second light source 103 and the third light source 104 is highly visible to a subject. When the ratio is adjusted to 1:0.5 (the second light source 103 and the third light source 104 each generates 250 lm), 1:0.25 (the second light source 103 and the third light source 104 each generates 125 lm), or 1:0.1 (the second light source 103 and the third light source 104 each generates 50 lm), the strobing of the second light source 103 and the third light source 104 becomes less visible, or even invisible to the subject. Depending on whether the subject needs preventive treatment or advance treatment of Alzheimer's disease (or memory loss), the ratio of the light output of the first light source 102 to the light output of the strobing light may be adjusted accordingly via the controller 101.

One variation of embodiment 100 is to add a fourth light source comprising 850 nm LED (without emitting any visible wavelengths). Controller 101 can be modified to operate this 850 nm LED light source at 10 Hz. Given that 850 nm wavelength is invisible, a user of this variation of embodiment 100 will not see any flickering at 10 Hz, thus getting the benefit of receiving theta stimulation for treating some degenerative brain disorders.

Figure 4:
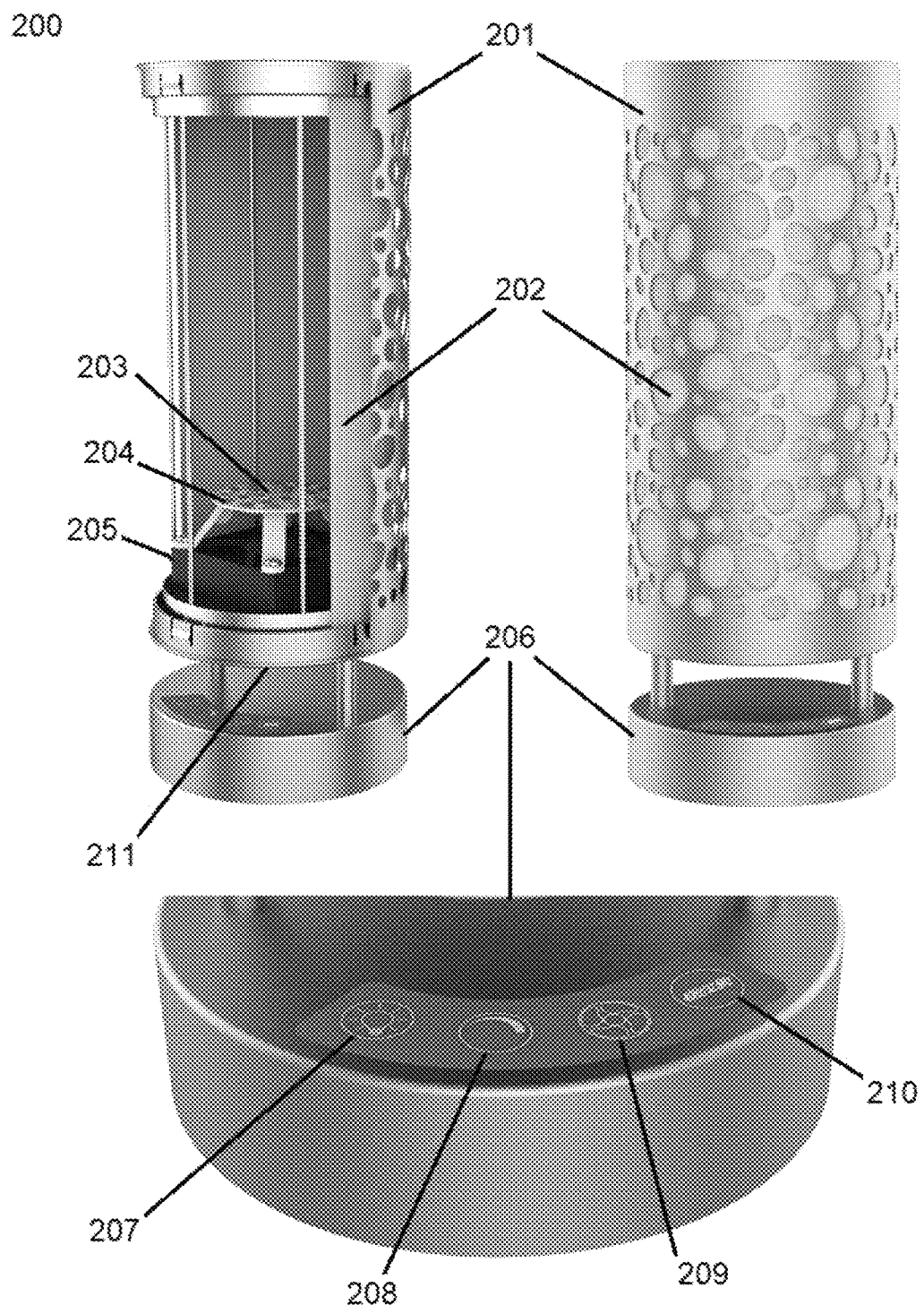
FIG. 4 schematically depicts an embodiment of the present disclosure in the form of a table lamp.

FIG. 4 is an embodiment of the lighting apparatus of the present disclosure in the form of a table lamp 200. The desktop lamp 200 has an external housing 201 to house an air filter 202, a fan 205, and a first LED light source 203 and a second LED light source 204. The light LED light sources 203 and 204 have the same color temperature 4000K. A controller is hidden inside the base 206 and is configured to provide various functions: adjusting the ratio of LO2 to LO1 (via touch button 207), dimming (via touch button 208), fan operation 209 (via touch button 209), and adjusting F3 frequency (via touch button 210 showing "40 Hz/32.5 Hz").

The controller (hidden inside the base 206) operates the second LED light source 204 at 120 Hz and the first LED light source 203 at either 80 Hz or 87.5 Hz, depending on the setting of button 210, through which a user can select 40 Hz or 32.5 Hz for the F3 frequency. If button 210 is set to 40 Hz, then the controller operates the first LED light source 203 at 80 Hz. If button 210 is set to 32.5 Hz, then the controller operates the first LED light source 203 at 87.5 Hz. The touch button 210 is set to 40 Hz for treating Alzheimer's disease and to 32.5 Hz for treating memory loss.

By default, LO1, the light output of the first LED light source 203, is 300 lm, and LO2, the light output of the second LED light source 204, is also 300 lm. The button 207 is used to set the ratio of LO2 to LO1 to be 1:1, 1:0.5, 1:0.25, or 1:0.1. There are two different approaches in implementing these ratios. One simple approach is as follows:

Ratio 1:1: LO2=300 lm, LO1=300 lm
Ratio 1:0.5: LO2=300 lm, LO1=150 lm
Ratio 1:0.25: LO2=300 lm, LO1=75 lm
Ratio 1:0.1: LO2=300 lm, LO1=30 lm This approach is easy to implement but with the side effect of reducing the total light output of the table lamp. Another, more sophisticate approach is as follows:

Ratio 1:1: LO2=300 lm, LO1=300 lm
Ratio 1:0.5: LO2=400 lm, LO1=200 lm
Ratio 1:0.25: LO2=480 lm, LO1=120 lm
Ratio 1:0.1: LO2=545.5 lm, LO1=54.5 lm With this second approach, the total light output of the table light is maintained at 600 lm regardless of the setting of button 207. For most people, a LO2 to LO1 ratio at 1:1 would result in a visible flicker at 40 Hz or 32.5 Hz. When button 207 sets the LO2 to LO1 ratio to 1:0.5 or 1:0.25, some people may not be able to see the flickering of the light output of the table lamp at 40 Hz or 32.5 Hz, even though such flickering is clearly present with the light output of the table lamp. When button 207 sets the LO2 to LO1 ratio to 1:0.1, most people can't perceive the flickering of the light output of the table lamp at 40 Hz or 32.5 Hz. Therefore, the table lamp enables each user to set the LO2 to LO1 ratio via button 207 according to personable preference or needs (e.g., choosing the LO2 to LO1 ratio to 1:0.25 for preventative treatment, or to 1:1 for enhanced treatment).

The dimming button 208 dims LO1 and LO2 concurrently and proportionally, thus maintaining the LO2 to LO1 ratio at any dimming level.

For the table lamp embodiment 200, color-tunable LED may be used for the first LED light source 203 and the second LED light source 204. In which case, the hidden controller may be enhanced to support a color tuner function thus enabling a user to change the color temperature of 203 and 204 simultaneously and always maintains the same color temperature for the first LED light source 203 and the second LED light source 204.

Embodiment 200 uses LED light sources for implementing the first light source and the second light source. In another embodiment with a different form factor (e.g., with a curved lighting surface), organic LED (OLED) may be preferred over LED, given its greatly flexibility on form factor.

The implementation of the controller (hidden inside base 206) of embodiment 200 may be revised such that for every 10 minutes it will suspend the operation the second LED light source 204 for 10 seconds and during such 10 seconds it will boost the light output of the first LED light source 203 to 600 lm. Moreover, this revised embodiment may support three modes of operations. In the first mode, the revised controller will operate the first LED light source 203 at F1=40 Hz and the second LED light source 204 at F2=44 Hz, thus creating a superimposed light at F3=4 Hz. Under this mode, this embodiment provides both gamma stimulation at F1=40 Hz and theta stimulation at F3=4 Hz. In the second mode, the revised controller will operate the first LED light source 203 at 40 Hz and the second LED light source 204 at 72.5 Hz. Under this mode, this embodiment provides gamma stimulation both at F1=40 Hz and F3=32.5 Hz. In the third mode, the revised controller will operate the first LED light source 203 at 50 Hz and the second LED light source 204 at 90 Hz. Under this mode, this embodiment provides only gamma stimulation at F3=40 Hz. The revised controller can switch between these three modes through the touch button 210:

Mode 1: F1=40 Hz, F2=44 Hz→F3=4 Hz (with both gamma stimulation at 40 Hz and theta stimulation at 4 Hz)
Mode 2: F1=40 Hz, F2=72.5 Hz→F3=32.5 Hz (with two gamma stimulations at 40 Hz and 32.5 Hz)
Mode 3: F1=50 Hz, F2=90 Hz→F3=40 Hz (with only one gamma stimulation at 40 Hz)

For any of the three modes, button 207 can be used to set the ratio of LO1 to LO2 to be 1:1, 1:0.5, 1:0.25, or 1:0.1. During the mono light source duration in the recalibration cycle, only the first LED light source 203 is on at 600 lm regardless of the ratio of LO1 to LO2. During the non-mono light source duration, the revised controller supports the following ratios of LO1 to LO2:

Ratio 1:1: LO1=300 lm, LO2=300 lm
Ratio 1:0.5: LO1=400 lm, LO2=200 lm
Ratio 1:0.25: LO1=480 lm, LO2=120 lm
Ratio 1:0.1: LO1=545.5 lm, LO2=54.5 lm One variation of embodiment 200 is to add a third light source comprising 850 nm LED (without emitting any visible wavelengths). The controller (hidden inside base 206) can be modified to operate this 850 nm LED light source at 10 Hz. Given that 850 nm wavelength is invisible, a user of this variation of embodiment 200 will not see any flickering at 10 Hz, thus getting the benefit of receiving theta stimulation for treating some degenerative brain disorders.

Another variation of embodiment 200 is to change the first light source 203 from 4000K LEDs to 850 nm LEDs (without emitting any visible wavelengths). The controller (hidden inside base 206) of this variation may be modified to operate the 850 nm LED light source 203 at 10 Hz and the second LED light source 204 at 50 Hz. In this case, F1=10 Hz and F3=50 Hz-10 Hz=40 Hz. Alternatively, the controller may be modified to operate the 850 nm LED light source 203 at 40 Hz and the second LED light source 204 at 50 Hz. In this case, F1=40 Hz and F3=50 Hz-40 Hz=10 Hz. Whether F1=10 Hz and F3=40 Hz or F1=40 Hz and F3=10 Hz, both gamma stimulation and theta stimulation are present simultaneously, thus having the benefit of CFC for better treatment of degenerative brain disorders. With the use of 850 nm LEDs, there is no flickering at 10H or 40 Hz.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A lighting apparatus, comprising:
   a controller;
   a first light source having a first color temperature (C1);
   a second light source having a second color temperature (C2) less than C1; and
   a third light source having a third color temperature (C3) greater than C1,
   wherein:
      the controller is configured to turn on the first light source without strobing,
      the controller is configured to turn on the second light source and the third light source alternately at a strobing frequency between 30 Hz and 65 Hz, resulting in a strobing light out of the second light source and the third light source with a combined color temperature approximating C1.

2. The lighting apparatus of claim 1, wherein the controller is configured to adjust a ratio of a first light output of the first light source to a second light output of the strobing light.

3. The lighting apparatus of claim 1, wherein at least one of the first light source, the second light source, and the third light source comprises a light emitting diode (LED) or organic LED (OLED).

4. The lighting apparatus of claim 1, further comprising a fourth light source configured to emit a near-infrared (NIR) wavelength, wherein the controller is configured to operate the fourth light source at an operating frequency 65 Hz.

5. A lighting apparatus, comprising
   a controller,
   a first light source emitting an LO1 amount of light output in lumens; and
   a second light source emitting an LO2 amount of light output in lumens;
   wherein:
      the controller is configured to turn on the first light source and the second light source simultaneously to generate a resulting LO1+LO2 amount of light output from the lighting apparatus,
      the controller is configured to operate the first light source at a first operating frequency (F1)≥50 Hz,
      the controller is configured to operate the second light source at a second operating frequency (F2) that is greater than F1 by at least 30 Hz but no more than 65 Hz, and
      a first light emitted by the first light source and a second light emitted by the second light source superimpose each other, resulting in a superimposed light having a third operating frequency (F3)=F2−F1.

6. The lighting apparatus of claim 5, wherein the controller is configured to set F3 to be between 35 Hz and 45 Hz.

7. The lighting apparatus of claim 5, wherein the controller is configured to set F3 to 32.5 Hz or 65 Hz.

8. The lighting apparatus of claim 5, wherein the controller is configured to adjust a ratio of LO2 to LO1 or, equivalently, a ratio of LO1 to LO2.

9. The lighting apparatus of claim 5, wherein the first light source and the second light source have a same color temperature.

10. The lighting apparatus of claim 5, wherein the controller is configured to adjust F3.

11. The lighting apparatus of claim 5, wherein at least one of the first light source and the second light source comprises a light emitting diode (LED) or organic LED (OLED).

12. The lighting apparatus of claim 5, further comprising a third light source configured to emit a near-infrared (NIR) wavelength, wherein the controller is configured to operate the third light source at a fourth operating frequency (F4)≤65 Hz.

13. A lighting apparatus, comprising
    a controller;
    a first light source configured to emit an LO1 amount of light output in lumens; and
    a second light source configured to emit an LO2 amount of light output in lumens;
    wherein:
       the controller is configured to turn on the first light source and the second light source simultaneously to generate a resulting LO1+LO2 amount of a combined light output from the lighting apparatus,
       the controller is configured to operate the first light source at a first operating frequency (F1),
       the controller is configured to operate the second light source at a second operating frequency (F2) greater than F1,
       a first light emitted by the first light source and a second light emitted by the second light source superimpose each other, resulting in a superimposed light having a third operating frequency (F3)=F2−F1, and
       the controller is configured, for every fixed period of a recalibration cycle, to suspend or turn off one of the two light sources for a short period of time of a mono light source duration and to boost a respective light output of the other of the two light sources to maintain a total light output of the lighting apparatus at LO1+LO2.

14. The lighting apparatus of claim 13, wherein the recalibration cycle is between 1 to 60 minutes.

15. The lighting apparatus of claim 13, wherein the mono light source duration is between 5 to 20 seconds.

16. The lighting apparatus of claim 13, wherein the controller is configured to set F1 to be between 35 Hz and 45 Hz.

17. The lighting apparatus of claim 13, wherein the controller is configured to set F1 to 32.5 Hz or 65 Hz.

18. The lighting apparatus of claim 13, wherein the controller is configured to set F3 to be between 35 Hz and 45 Hz.

19. The lighting apparatus of claim 13, wherein the controller is configured to set F3 to 32.5 Hz or 65 Hz.

20. The lighting apparatus of claim 13, wherein the controller is configured to set F3 between 3 Hz to 10 Hz.

21. The lighting apparatus of claim 13, wherein the controller is configured to adjust a ratio of LO2 to LO1 or equivalently, a ratio of LO1 to LO2.

22. The lighting apparatus of claim 13, wherein the first light source and the second light source have a same color temperature.

23. The lighting apparatus of claim 13, wherein the controller is configured to adjust F3.

24. The lighting apparatus of claim 13, wherein at least one of the first light source and the second light source comprises a light emitting diode (LED) or organic LED (OLED).

25. The lighting apparatus of claim 13, further comprising a third light source configured to emit a near-infrared (NIR) wavelength, wherein the controller is configured to operate the third light source at a fourth operating frequency (F4) 65 Hz.

26. A lighting apparatus, comprising
    a controller;

a first light source configured to emit a near-infrared (NIR) wavelength; and a second light source configured to emit a visible wavelength;

wherein:

the controller is configured to turn on the first light source and the second light source simultaneously, the controller is configured to operate the first light source at a first operating frequency (F1)≤65 Hz, the controller is configured to operate the second light source at a second operating frequency (F2) greater than F1, and a first light emitted by the first light source and a second light emitted by the second light source superimpose each other, resulting in a superimposed radiation having a third operating frequency (F3)=F2−F1.

27. The lighting apparatus of claim 26, wherein the controller is configured to set F1 to be between 3 Hz and 10 Hz.

28. The lighting apparatus of claim 26, wherein the controller is configured to set F1 to be between 35 Hz and 45 Hz.

29. The lighting apparatus of claim 26, wherein the controller is configured to set F1 to 32.5 Hz or 65 Hz.

30. The lighting apparatus of claim 26, wherein the controller is configured to set F3 between 3 Hz to 10 Hz.

31. The lighting apparatus of claim 26, wherein the controller is configured to set F3 to be between 35 Hz and 45 Hz.

32. The lighting apparatus of claim 26, wherein the controller is configured to set F3 to 32.5 Hz or 65 Hz.

33. The lighting apparatus of claim 26, wherein the controller is configured to adjust F3.

34. The lighting apparatus of claim 26, wherein the controller is configured, for every fixed period of a recalibration cycle, to suspend or turn off the first light source for a short period of time of a mono light source duration.

35. The lighting apparatus of claim 34, wherein the recalibration cycle is between 1 to 60 minutes.

36. The lighting apparatus of claim 34, wherein the mono light source duration is between 5 to 20 seconds.

37. The lighting apparatus of claim 26, wherein at least one of the first light source and the second light source comprises a light emitting diode (LED) or organic LED (OLED).

* * * * *